United States Patent

Fujimura et al.

[11] Patent Number: 5,808,697
[45] Date of Patent: Sep. 15, 1998

[54] VIDEO CONTRAST ENHANCER

[75] Inventors: Naohiro Fujimura; Hitoshi Hasegawa; Takuji Kurashita; Hiroshi Onishi; Masayuki Tsuji; Yuuji Yamamoto; Shinji Takeuchi, all of Tokyo, Japan

[73] Assignee: Mitsubishi Denki Kabushiki Kaisha, Tokyo, Japan

[21] Appl. No.: 663,659

[22] Filed: Jun. 14, 1996

[30] Foreign Application Priority Data

Jun. 16, 1995 [JP] Japan .................................. 7-150410
Mar. 29, 1996 [JP] Japan .................................. 8-075972

[51] Int. Cl.$^6$ .................................................. H04N 5/57
[52] U.S. Cl. ........................................... 348/672; 382/168
[58] Field of Search .................................... 348/671, 674, 348/675, 678–686, 672; 382/162, 167, 168; 358/515, 518, 520; H04N 5/52, 5/57

[56] References Cited

U.S. PATENT DOCUMENTS

| | | | |
|---|---|---|---|
| 3,914,545 | 10/1975 | Engel | 348/679 |
| 4,295,166 | 10/1981 | Shanley, II et al. | 348/684 |
| 4,688,095 | 8/1987 | Beg et al. | 348/671 |
| 4,829,381 | 5/1989 | Song et al. | 348/674 |
| 5,003,394 | 3/1991 | Lagoni | 348/678 |
| 5,191,420 | 3/1993 | Lagoni et al. | 348/678 |
| 5,245,434 | 9/1993 | Gurley | 348/682 |
| 5,291,313 | 3/1994 | Kim | 348/678 |
| 5,294,986 | 3/1994 | Tsuji et al. | 348/674 |
| 5,335,069 | 8/1994 | Kim | 348/678 |
| 5,394,195 | 2/1995 | Herman | 348/675 |
| 5,523,785 | 6/1996 | Muramoto | 348/675 |
| 5,638,137 | 6/1997 | Thomas | 348/682 |

FOREIGN PATENT DOCUMENTS 690382A  3/1994  Japan .

OTHER PUBLICATIONS

Kobayashi et al. (1994) The Transactions of the Institute of Electronics, Information and Communication Engineers of Japan D–II, V.J77–D–II, No. 3, pp. 502–509. (no translation).

Primary Examiner—Richard Lee

[57] ABSTRACT

A video contrast enhancer enhances luminance contrast by dividing each video frame or field into blocks, calculating a mean luminance level for each block, selecting mapping functions on the basis of these mean luminance levels over a series of frames or fields, and mapping the video luminance levels according to the selected mapping functions. Color-saturation contrast is enhanced by modifying the amplitude of the modulated chrominance signal by the histogram equalization method, preferably by making a single linear modification in each period of the chrominance signal, so that color phase is not affected. For video signals with non-picture bands, these enhancements are preferably restricted to the picture area. If a black offset is present, it is preferably removed.

20 Claims, 16 Drawing Sheets

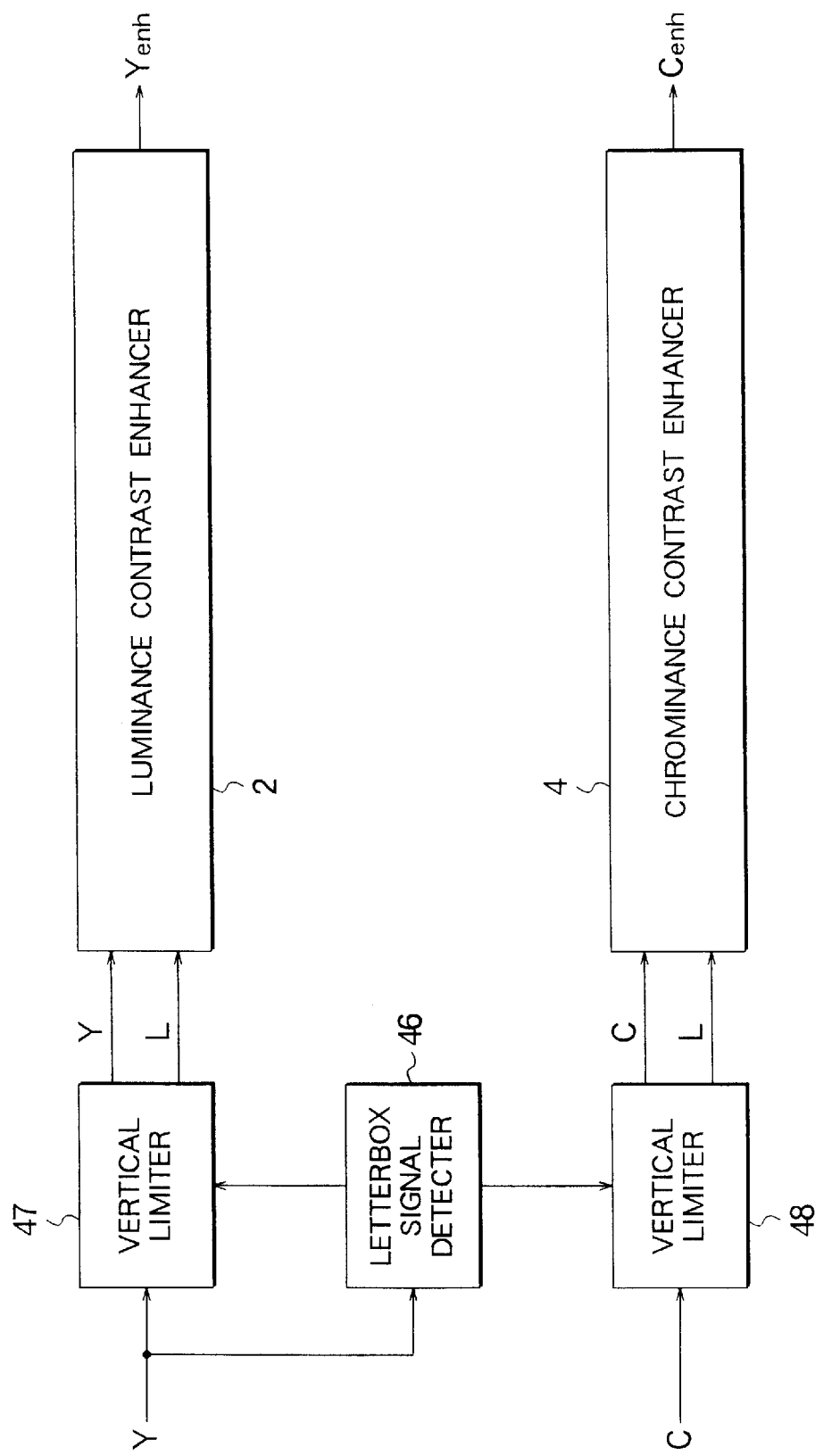

VIDEO CONTRAST ENHANCER

BACKGROUND OF THE INVENTION

The present invention relates to a contrast enhancer for enhancing the luminance contrast and color-saturation contrast of a video signal in a television receiver, video tape recorder, or other video apparatus.

A conventional contrast enhancer, which will be described in more detail at the end of this specification, uses the well-known histogram equalization method to enhance the luminance contrast of a video signal. Basically, this method maximizes contrast by adjusting luminance values so that all luminance levels are equally represented. This is accomplished by calculating a normalized cumulative histogram of the luminance values in an image, and using the normalized cumulative histogram as a mapping function.

Applied in this basic form, the histogram equalization method has a tendency to over-enhance contrast in one part of the luminance scale, causing conspicuous loss of contrast in other parts of the scale. In particular, there is a tendency toward excessive contrast compression at the black and white ends of the scale, leading to loss of detail in the darkest and lightest parts of the image. One cause of this problem is that the same mapping function is applied to all parts of the image, even though different parts of the image may have quite different luminance characteristics.

For still images, a known adaptive histogram equalization method avoids this problem by calculating a separate mapping function for each picture element (pixel) in the image. This method is too slow for use at video image rates.

Also known is a faster adaptive method that provides a set of predetermined mapping functions, divides an image into blocks, selects a separate mapping function for each block, and converts luminance levels by using a weighted average of the selected mapping functions. This block adaptive method is satisfactory for still images, but when applied to moving images, it produces an extreme form of undulating distortion, e.g. at moving boundaries between dark and light areas. Flicker also becomes a problem, due to frequent and abrupt changes of mapping functions from one video frame to the next. A further problem is that of buffering the image while the mapping functions are being selected. Buffering even one video image requires a large amount of memory, which takes up space and adds substantially to the cost of the contrast enhancer.

Some conventional contrast enhancers use luminance information to enhance chrominance contrast as well as luminance contrast. A resulting problem is unnatural chrominance enhancement, because luminance and chrominance characteristics are not related in a fixed way.

Another problem, encountered in all of the conventional enhancement methods described above, is that mapping functions are calculated or selected incorrectly when the video signal has non-picture bands at the top and bottom, or has a luminance offset.

SUMMARY OF THE INVENTION

It is accordingly an object of the present invention to enhance the luminance contrast of a video signal without loss of local detail.

It is also an object of the invention is to enhance luminance contrast without causing undulating distortion.

A further object of the invention is to enhance luminance contrast without causing flicker.

Another object is to enhance the color-saturation contrast of a video signal independently of luminance contrast enhancement.

Yet another object is to enhance the color-saturation contrast of a video signal without alteration of hue.

Still another object is to enhance contrast without the need for image buffering.

A still further object is appropriate enhancement of the contrast of a video signal having non-picture bands at the top and bottom.

A yet further object is appropriate enhancement of the luminance contrast of a video signal having a luminance offset.

The invented contrast enhancer processes a video signal representing a moving picture made up of a sequence of images. A block average processor divides each image into a plurality of block-shaped areas and calculates a mean luminance level for each area. This mean value may be calculated on the basis of only the pixels in the area itself, or some or all of the pixels in the area itself and some or all of the pixels in adjacent areas.

These mean luminance levels are passed to a mapping function selector that adjusts a selection signal stored in a selection memory. The selection signal is adjusted in small steps on the basis of the mean luminance levels in a plurality of images in the sequence. To avoid flicker, the mapping function preferably changes the selection signal only when the mean luminance levels change consistently over a certain number of consecutive images.

A primary mapper is provided with a set of predetermined mapping functions. The selection signal stored in the selection memory selects one of these mapping functions. The primary mapper maps the luminance levels of the video signal according to the selected mapping function.

Various mapping schemes are possible within this framework. The selection memory may store one selection signal per image, or one selection signal per area. In the latter case, the contrast enhancer maps the luminance level of each pixel according to both the mapping function selected for the area containing the pixel and the mapping functions selected for adjacent areas. The mapping results are combined by a weighted-average processor.

For a color video signal, the contrast enhancer also enhances the color-saturation contrast, using the histogram equalization method. The enhancement is performed on the modulated chrominance signal, before demodulation into color difference signals. To avoid alteration of hue, the amplitude is preferably modified linearly in each individual period of the chrominance signal.

The invented contrast enhancer preferably has a letterbox signal detector to detect video signals with non-picture bands above and below the picture area, so that contrast enhancement processing can be limited to the picture area.

The invented contrast enhancer preferably also has a black offset canceler for detecting and canceling black offset in the luminance signal prior to contrast enhancement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

BRIEF DESCRIPTION OF THE DRAWINGS

In the accompanying drawings:

FIG. 17 is a block diagram of a fourth embodiment of the invention;

DETAILED DESCRIPTION OF THE PREFERRED EMBODIMENTS

Embodiments of the invention will be described with reference to the attached illustrative drawings. The term "image" will be used to mean one frame of a progressively scanned video signal, or one field of an interlaced video signal such as the signal designated by the National Television System Committee (NTSC). In both cases, one image corresponds to one vertical scanning period.

First embodiment

Figure 1:
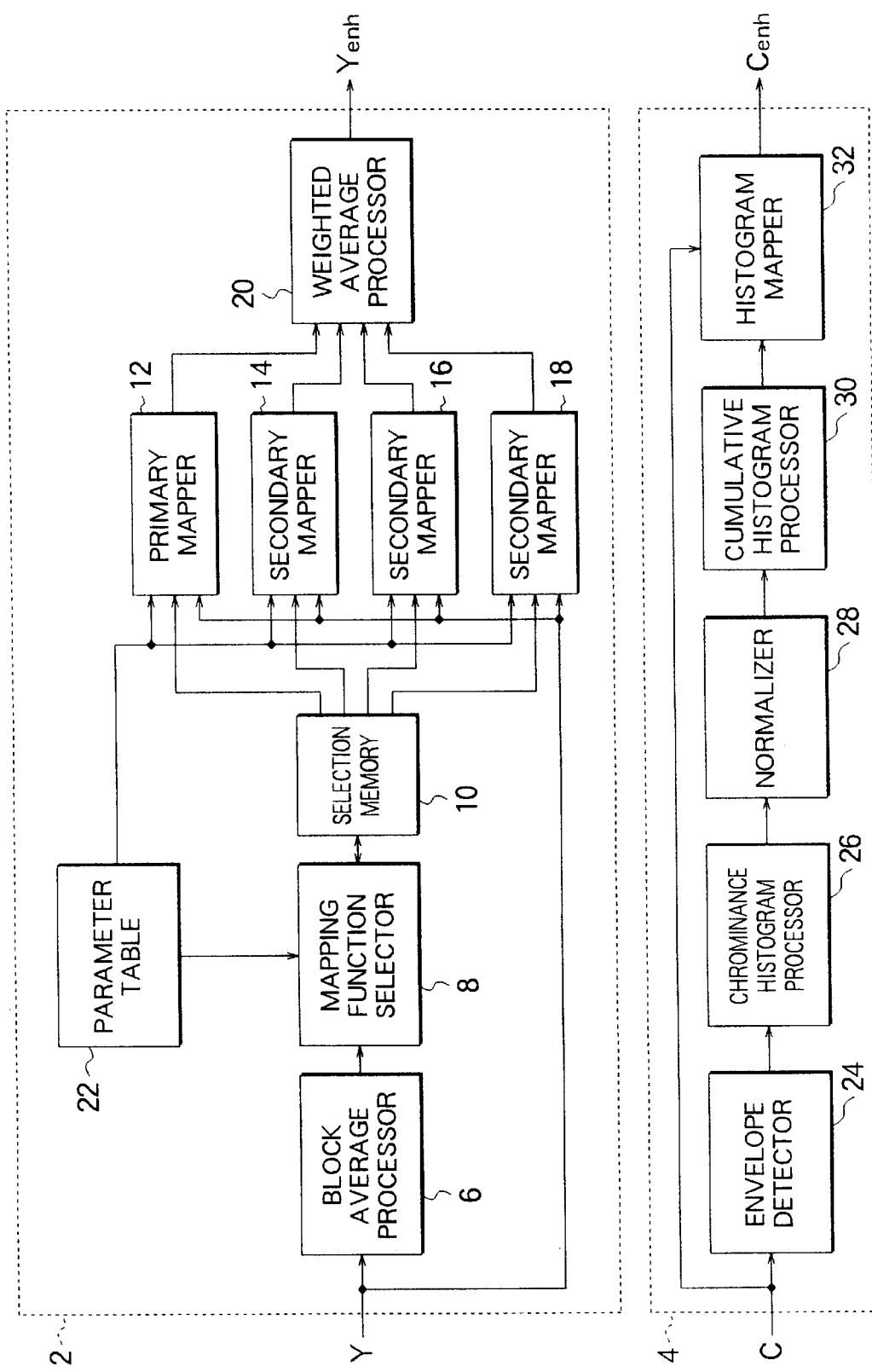
FIG. 1 is a block diagram of a first embodiment of the invention.

Referring to FIG. 1, the first embodiment has a luminance contrast enhancer 2 and a chrominance contrast enhancer 4. The luminance contrast enhancer 2 comprises a block average processor 6, a mapping function selector 8, a selection memory 10, a primary mapper 12, three secondary mappers 14, 16, and 18, a weighted average processor 20, and a parameter table 22. The chrominance contrast enhancer 4 comprises an envelope detector 24, a chrominance histogram processor 26, a normalizer 28, a cumulative histogram processor 30, and a histogram mapper 32.

These circuits can be created from standard building blocks such as standard cells in an application-specific integrated circuit. Alternatively, a general-purpose processor such as a digital signal processor can be provided with the necessary memory and programmed to carry out the functions of some or all of these circuits.

Next, the operation of the luminance contrast enhancer 2 will be described.

The block average processor 6 receives a digitized luminance signal Y indicating the luminance levels of individual pixels in a sequence of video images constituting a moving picture. The luminance signal Y is, for example, the luminance component of a composite video signal that has been separated into luminance and chrominance components. The block average processor 6 divides each image into a plurality of rectangular blocks of identical size and shape, and calculates the mean luminance level of the pixels in each block and its adjacent blocks. This does not require buffering of the luminance signal. The block average processor 6 comprises, for example, a set of registers assigned to different blocks, and an adder for adding each incoming luminance value to the appropriate registers. All images are divided into blocks in the same way.

Figure 2:
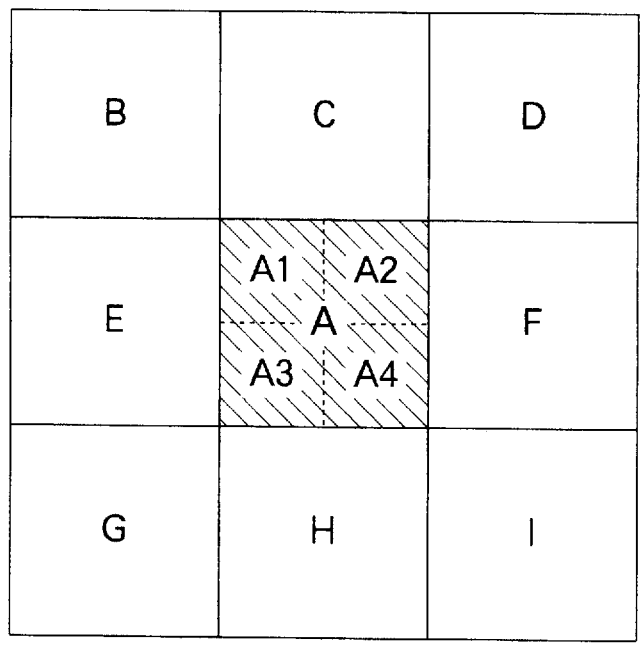
FIG. 2 illustrates a block divided into sub-blocks, and shows adjacent blocks.

FIG. 2 shows a block A (divided into four sub-blocks, for a reason to be described later) and its eight adjacent blocks, indicated by letters from B to I. For block A, the block average processor outputs the mean luminance level of all the pixels in all nine blocks from A to I.

If block A is located in, for example, the top-left corner of the image, then blocks B, C, D, E, and G are missing. In this case the block average processor 6 substitutes the mean luminance level of block A for missing blocks B, C, and E, the mean luminance level of block F for missing block D, and the mean luminance level of block H for missing block G.

Referring again to FIG. 1, the selection memory 10 stores one selection signal for each block. These selection signals select mapping functions employed in the primary and secondary mappers 12, 14, 16, and 18. The mapping functions belong to a predetermined set of mapping functions that enhance contrast in different, but overlapping, luminance ranges. The mapping functions are numbered in order of the luminance ranges they enhance, e.g. so that higher-numbered mapping functions enhance contrast in brighter luminance ranges. The value of each selection signal is the mapping-function number of the mapping function selected by the selection signal.

The mapping function selector 8 adjusts the selection signals stored in the selection memory 10 as follows.

From each mean luminance level output by the block average processor 6, the mapping function selector 8 first obtains the mapping-function number of the mapping function that enhances contrast in a luminance range centered most closely to that mean luminance level. According to one preferred scheme, the luminance ranges enhanced by the mapping functions are offset from one another in steps equal to the quantization step size on the luminance scale. The mapping function selector 8 obtains a mapping-function number by, for example, a rule that assigns different mapping-function numbers to different ranges of mean luminance levels. The correspondence established by this rule between mean luminance levels and mapping-function numbers need not be linear, and need not be one-to-one.

For each block, the mapping function selector 8 compares the mapping-function number thus obtained with the selection signal stored in the selection memory 10, and keeps a first count of the number of times the mapping-function number is higher than the selection signal value. This first count is reset to zero whenever the mapping-function number is equal to or less than the selection signal value. When the first count reaches a certain value (e.g. ten), the mapping function selector 8 increments the selection signal value stored in the selection memory 10 by one, so that the selection signal selects the next-higher-numbered mapping function.

Similarly, the mapping function selector 8 keeps a second count of the number of times the mapping-function number is lower than the selection signal value, resetting this count to zero whenever the mapping-function number is equal to or greater than the selection signal value, and decrements the selection signal value by one if this second count reaches the above-mentioned certain value.

Independent first and second counts are maintained for each block.

Each time a selection signal is incremented or decremented, the above counting process starts over again for that selection signal. As a result, the selection signal changes at a limited rate, e.g. at minimum intervals of ten images, and then only if the mapping-function numbers obtained in the mapping function selector 8 for the relevant block were consistently higher than the selection signal during those ten images, or consistently lower during those ten images.

In other words, if, in a state in which a certain luminance range is enhanced, the mapping functions selected by the mean luminance level continue to be one or ones for enhancing luminance range or ranges higher than the above-mentioned certain luminance range for a predetermined number of images, the selection signal is changed to one for designating a mapping function for enhancement of a luminance range higher than the above-mentioned certain luminance range. If, in a state in which a certain luminance range is enhanced, the mapping functions selected by the mean luminance level continue to be one or ones for enhancing luminance range or ranges lower than the above-mentioned certain luminance range for a predetermined number of images, the selection signal is changed to one for designating a mapping function for enhancement of a luminance range lower than the above-mentioned certain luminance range.

The selection memory 10 outputs the stored selection signals to the primary and secondary mappers 12, 14, 16, and 18. The mappers 12, 14, 16, and 18 also receive the luminance signal Y. Output of selection signals from the selection memory 10 is coordinated with the luminance signal Y as follows.

Referring again to FIG. 2, block A is subdivided into four sub-blocks A1, A2, A3, and A4. While the mappers receive luminance values Y for pixels in sub-block A1, the selection memory 10 outputs the selection signal stored for block A to the primary mapper 12, and the selection signals stored for blocks B, C, and E to the secondary mappers 14, 16, and 18. For pixels in sub-block A2, the selection memory 10 outputs the selection signal stored for block A to the primary mapper 12, and the selection signals stored for blocks C, D, and F to the secondary mappers 14, 16, and 18. For pixels in sub-block A3, the selection signals for blocks E, G, and H are similarly output. For pixels in sub-block A4, the selection signals for blocks F, H, and I are output.

As in the calculation of mean luminance levels, special provisions are necessary at the edges of the image. If block A is in the top left corner, so that blocks B, C, D, E, and G are missing, then for pixels in sub-block A1, the selection signal stored for block A is output to all four mappers 12, 14, 16, and 18. For sub-block A2, the selection signal stored for block A is output to two of the mappers, 12 and 14, and the selection signal stored for block F to the other two mappers, 16 and 18. For sub-block A3, the selection signal stored for block A is output to two of the mappers, 12 and 14, and the selection signal stored for block H to the other two mappers, 16 and 18.

At the instant when the mapping function selector 8 alters the selection signal for a particular block, input of the pixel values of that block to the block average processor 6 and the mappers 12, 14, 16, and 18 has already been completed, so the mappers do not begin receiving the new selection signal until the next image. As a result, each video image is mapped with mapping functions selected on the basis of preceding images. The mapping process is described next.

Figures 3A, 3B:
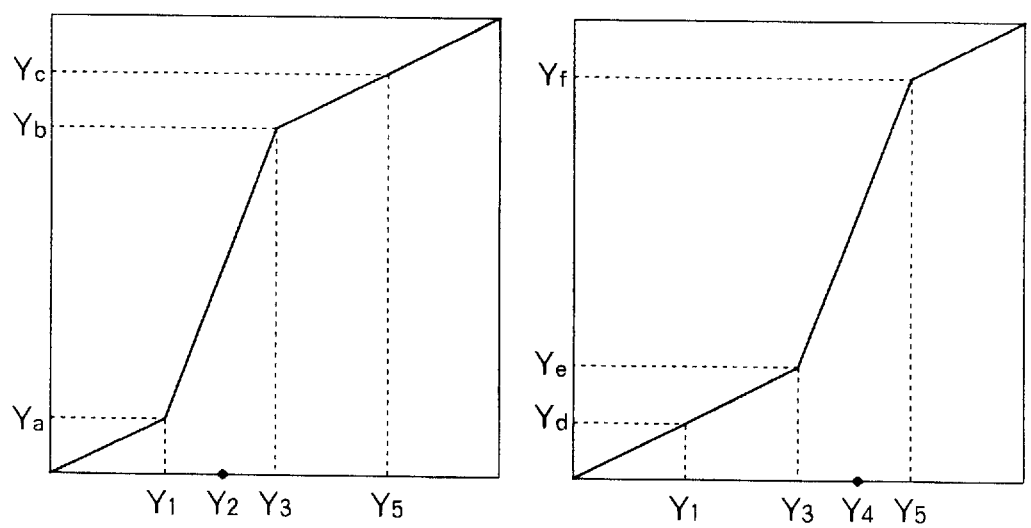
FIG. 3A and FIG. 3B illustrate mapping functions.

FIGS. 3A and 3B show two examples of the type of mapping functions employed in the mappers 12, 14, 16, and 18. In both drawings the horizontal axis represents the input luminance value, and the vertical axis represents the output value. The mapping function in FIG. 3A maps $Y_1$ to $Y_a$, $Y_3$ to $Y_b$, and $Y_5$ to $Y_c$, thereby enhancing contrast in the range between $Y_1$ and $Y_3$, centered at the luminance value $Y_2$. Similarly, the mapping function in FIG. 3B maps $Y_1$, $Y_3$, and $Y_5$ to $Y_d$, $Y_e$ and $Y_f$, enhancing contrast in the range between $Y_3$ and $Y_5$, centered at $Y_4$.

The mappers 12, 14, 16, and 18 store the mapping functions in the form of parameter values, and perform the mapping operations illustrated in FIGS. 3A and 3B by performing arithmetic operations on the luminance signal Y. For the mapping function in FIG. 3A, the luminance value Y is compared with $Y_1$ and $Y_3$, and one of the following operations i s performed:

$Y'=M_0Y$ if $Y \leq Y_1$ $Y'=M_1Y+M_2$ if $Y_1 \leq Y \leq Y_3$ $Y'=M_3Y+M_4$ if $Y_3<Y$ The parameters $M_0$, $M_1$, $M_2$, $M_3$, and $M_4$ can be prestored in the mappers, but they are preferably generated as needed, from the selection signals and luminance value. The values $Y_1$ and $Y_3$ wit h which the luminance value Y is compared can be similarly generated from the selection signal. Each of the mappers 12, 14, 16, and 18 thus comprises a multiplier, an adder, and the necessary parameter-generating logic. All four mappers 12, 14, 16, and 18 has identical internal configuration, and generate identical mapping functions.

The weighted average processor 20 takes a weighted average of the four luminance values Y' output by the mappers 12, 14, 16, and 18. The weighting is responsive to pixel position, giving greatest weight to the mapping functions of the closest blocks. For the pixel in the top left corner of sub-block A1 in FIG. 2, for example, the four values may be given substantially equal weight. For the pixel in the lower right corner of sub-block A1, the value obtained with the mapping function selected for block A is given greater weight than the values obtained with the mapping functions of blocks C and E, which are in turn given greater weight than the value obtained with the mapping function of block B. Suitable weights can be obtained by means of counters disposed in the weighted average processor 20.

The weighted average obtained by the weighted average processor 20 is output as an enhanced luminance signal $Y_{enh}$.

The parameter table 22 in FIG. 1 stores parameter data used by the mapping function selector 8 in obtaining mapping-function numbers and adjusting selection signals, and by the mappers 12, 14, 16 and 18 in executing the mapping process. These parameter data are transferred to the mapping function selector 8 and mappers 12, 14, 16, and 18 when the contrast enhancer is powered up. Alternatively, the parameter data can be transferred when the contrast enhancer is manufactured, in which case the parameter table 22 resides in a device that controls the manufacturing process.

The mapping functions employed in the mappers 12, 14, 16, and 18 are constructed so as to avoid over-enhancement and the other problems associated with histogram equalization. By selecting different mapping functions for different parts of each image, the invented contrast enhancer also avoids loss of local detail.

Calculating the mean luminance level of nine blocks at a time instead of just one tends to smooth out the differences between the mapping-function numbers obtained for adjacent blocks. This reduces the undulating distortion produced by the block adaptive method in moving images (when the object forming the image is moving relative to the surrounding objects, or the position of the object in the display screen, or the size of the object is changing due to panning or zoom-in or zoom-up). Altering the mapping-function selections in minimal increments and at a limited rate further reduces this undulating distortion, and reduces flicker to a substantially imperceptible level.

In addition, by mapping the luminance levels of each video image with mapping functions selected on the basis of preceding images, the invented contrast enhancer avoids the need to buffer the luminance signal.

Next, the operation of the chrominance contrast enhancer 4 will be described. The chrominance contrast enhancer 4 in this first embodiment employs a conventional version of the histogram equalization method; the following description will accordingly be brief.

Referring again to FIG. 1, the chrominance contrast enhancer 4 receives an analog chrominance signal C, which is a subcarrier signal modulated in amplitude and phase. The chrominance signal C is, for example, the chrominance component of the above-mentioned composite video signal. The amplitude of this signal C represents color saturation; the phase of C represents color phase or hue.

Figure 4:
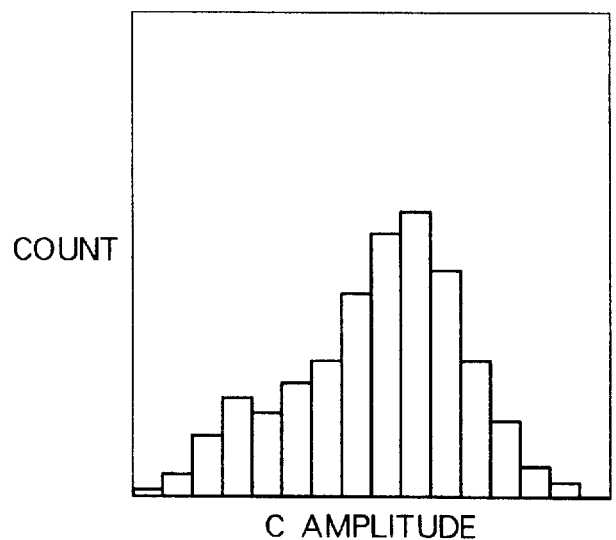
FIG. 4 illustrates a chrominance histogram.

The envelope detector 24 generates an analog signal representing the amplitude of the chrominance signal C. The chrominance histogram processor 26 samples the output of the envelope detector 24 and constructs, for each image, a histogram of the chrominance amplitude values in that image. FIG. 4 shows an example of such a histogram. Chrominance amplitude is represented on the horizontal axis, with count values on the vertical axis. In FIG. 4 the chrominance amplitude is digitized with sixteen quantization steps.

The normalizer 28 applies well-known normalization procedures to the chrominance histogram. These procedures determine the dynamic range of the enhanced chrominance signal.

Figure 5:
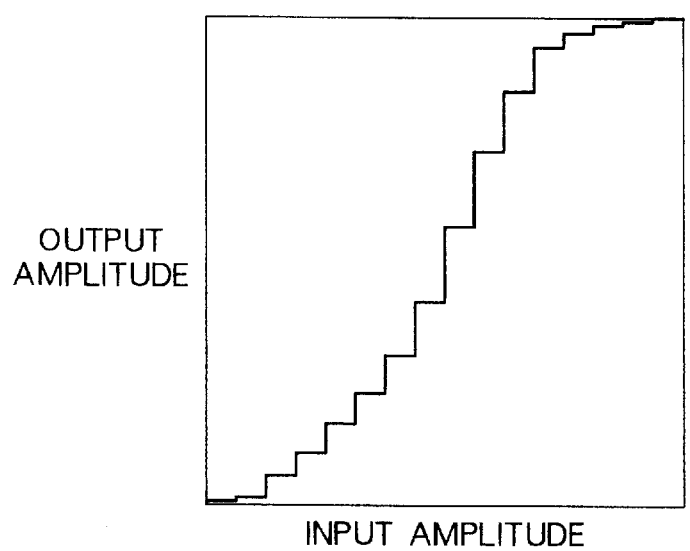
FIG. 5 illustrates a cumulative chrominance histogram.

The cumulative histogram processor 30 takes cumulative totals of the values in the normalized chrominance histogram, thereby obtaining a cumulative chrominance histogram. FIG. 5 shows a cumulative chrominance histogram corresponding to the chrominance histogram in FIG. 4. The horizontal axis in FIG. 5 represents the input amplitude of the chrominance signal, while the vertical axis represents output amplitude.

The histogram mapper 32 receives and digitizes the chrominance signal C and maps the chrominance signal values according to the cumulative chrominance histogram obtained by the cumulative histogram processor 30 for the preceding image. This mapping alters the magnitude but not the sign of the signal values. The effect is to enhance color-saturation contrast. Use of the cumulative chrominance histogram obtained for the preceding image avoids the need for buffering of the chrominance signal.

The results of the mapping operation are output as an enhanced chrominance signal $C_{enh}$. Although digitally produced, $C_{enh}$ is preferably converted back to analog form to simplify subsequent demodulation into color difference signals.

By processing the chrominance signal C independently of the luminance signal Y, the invented contrast enhancer can enhance color-saturation contrast in an appropriate manner, regardless of the luminance characteristics of the video signal. By operating on the chrominance signal prior to demodulation, the invented contrast enhancer can enhance saturation contrast by a single application of the histogram equalization method; contrast enhancement of the color difference signals would require two separate operations.

As the eye is less sensitive to color-saturation differences than to luminance differences, the drawbacks of the histogram equalization method become comparatively inconspicuous when this method is applied to the chrominance signal. For the same reason, the chrominance signal can be digitized with fewer quantization steps than are required for luminance, enabling the size of the histogram equalization circuitry to be reduced.

Although described above as an analog signal, the chrominance signal C can be input to the chrominance contrast enhancer 4 in sampled digital form, eliminating the need for sampling in the histogram mapper 32. In this case, the envelope detector 24 can, for example, convert the chrominance signal C back to analog form to get the amplitude value.

Next, some variations of the first embodiment will be described.

Figure 6:
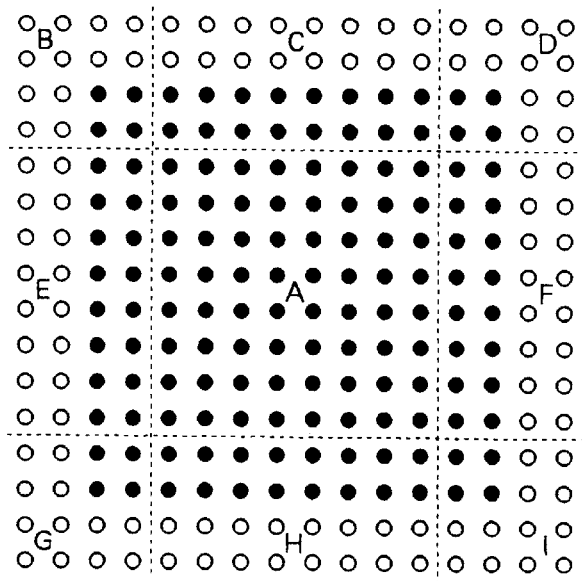
FIG. 6 shows the pixels included in one alternative computation of a mean luminance level for a block.

To reduce the computation load on the block average processor 6, the mean luminance level for a block can be calculated from a reduced set of pixels. For example, referring to FIG. 6, the mean luminance level for block A can be calculated from the sum of the luminance values of the associated set of pixels indicated by black dots, consisting of all the pixels in block A and some but not all of the pixels in each adjacent block.

Figure 7:
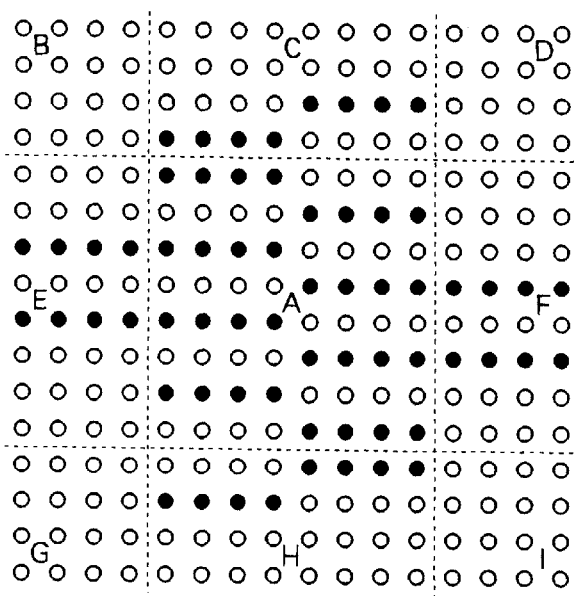
FIG. 7 shows the pixels included in another alternative computation of a mean luminance level for a block.

FIG. 7 shows an alternative scheme in which the set of pixels associated with block A includes half of the pixels in block A and a like number of pixels distributed among adjacent blocks C, E, F, and H. When the pattern in FIG. 7 is applied to all blocks, each pixel is associated with only one block. This scheme reduces distortion with a minimum of computation.

The first embodiment can be applied to a monochrome video signal, in which case there is no chrominance signal C and the chrominance contrast enhancer 4 can be omitted.

Second embodiment

Figure 8:
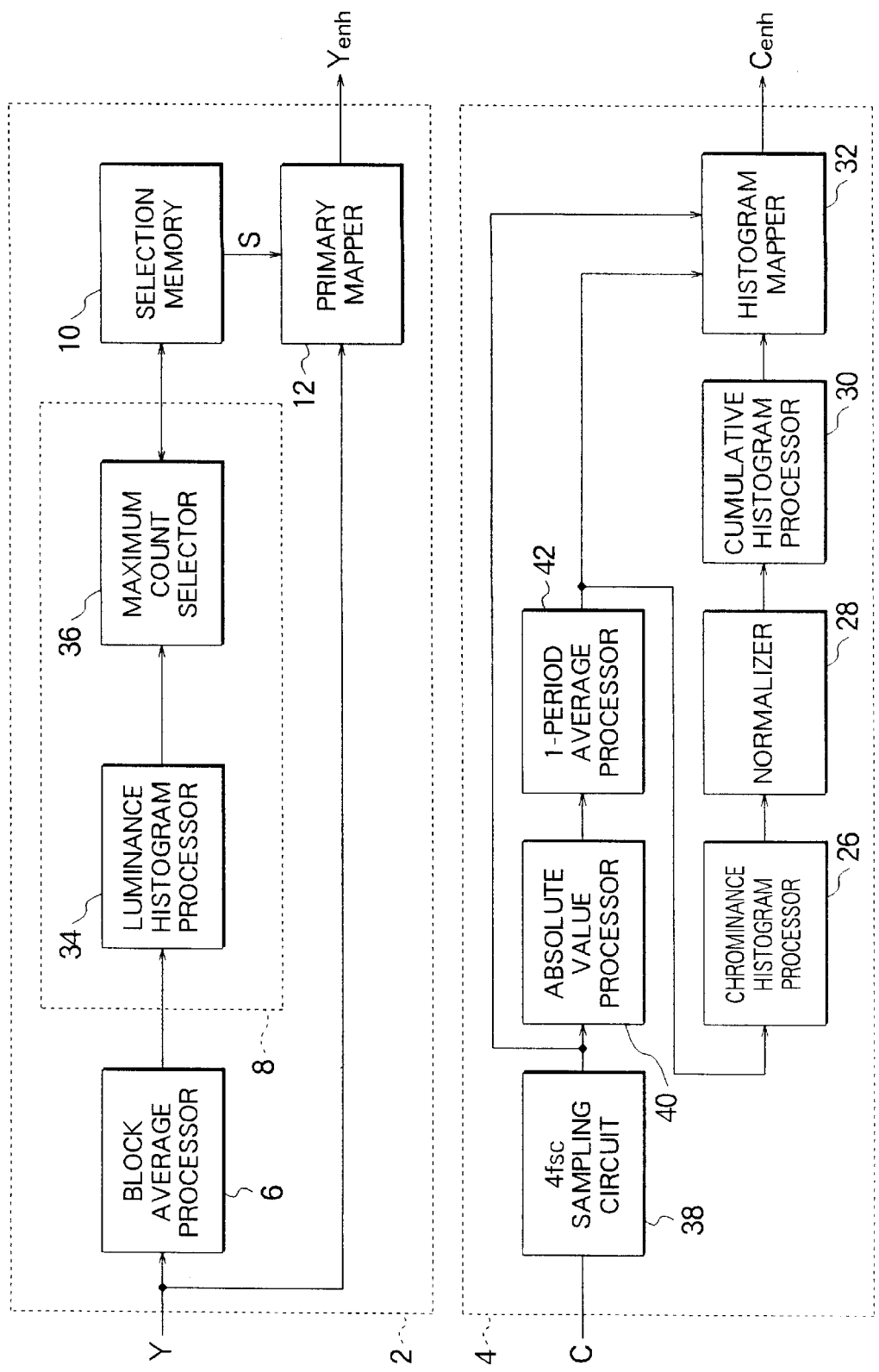
FIG. 8 is a block diagram of a second embodiment of the invention.

FIG. 8 shows the second embodiment, using the same reference numerals as in FIG. 1 to identify corresponding elements, although some of these elements function differently from the corresponding elements in the first embodiment.

In the luminance contrast enhancer 2, the block average processor 6, primary mapper 12, and parameter table 22 are as in the first embodiment, but the mapping function selector 8 and selection memory 10 differ, and there are no secondary mappers and no weighted average processor. The mapping function selector 8 comprises a luminance histogram processor 34 and a maximum count selector 36.

In the chrominance contrast enhancer 4, the envelope detector 24 of the first embodiment is replaced by a 4f$_{SC}$ sampling circuit 38, an absolute value processor 40, and a one-period average processor 42. The symbol f$_{SC}$ denotes the frequency of the chrominance signal C, referred to as the subcarrier frequency.

Next, the operation of the luminance contrast enhancer 2 will be described, omitting repeated descriptions of the block average processor 6 and primary mapper 12.

Figure 9:
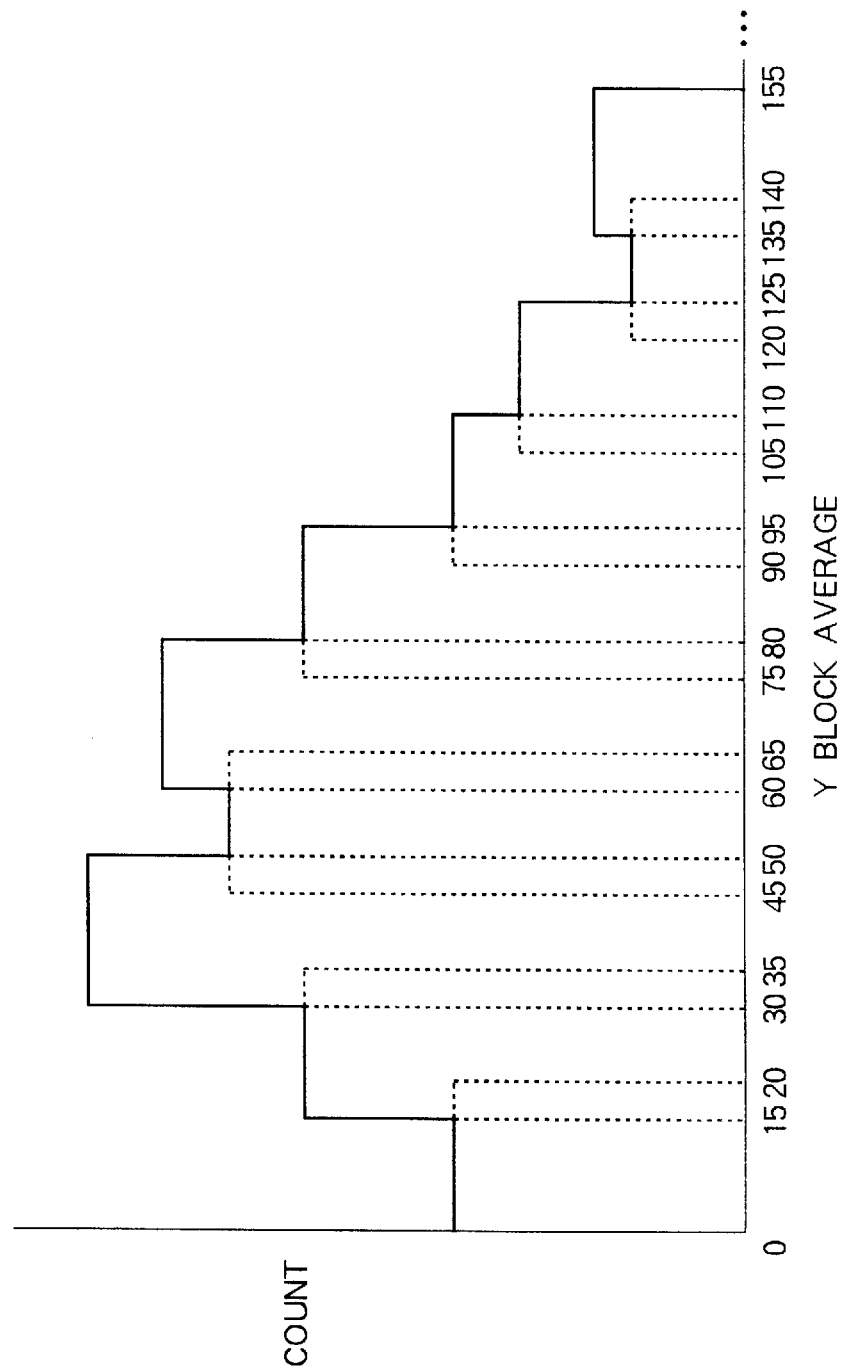
FIG. 9 shows a mean luminance histogram calculated in the second embodiment.

The mean luminance levels calculated by the block average processor 6 are passed to the luminance histogram processor 34, which constructs a histogram of the mean values. One histogram is constructed per image. An example of this histogram is shown in FIG. 9. The horizontal axis in FIG. 9 represents a plurality of overlapping luminance ranges in which the mean levels may fall; the vertical axis represents the number of blocks with mean luminance levels in each range.

The leftmost range in FIG. 9 represents blocks with mean luminance levels from zero to twenty, while the next range represents blocks with mean luminance values from fifteen to thirty-five. Blocks with mean luminance levels from fifteen to twenty are counted in both ranges. The other ranges overlap similarly. The overlap tends to smooth out the shape of the histogram.

The maximum count selector 36 compares the count values in the histogram constructed by the luminance histogram processor 34, finds the luminance range having the highest count value, and generates a mapping-function number according to, preferably, the minimum luminance value in that range. The mapping function having this mapping-function number should be a mapping function that enhances contrast in this luminance range, although the luminance range enhanced by the mapping function does not have to be identical to the luminance range in the luminance histogram. If there is a one-to-one correspondence between mapping-function numbers and luminance levels, then from the histogram in FIG. 9, the maximum count selector would select mapping function number thirty. One mapping function is selected for each image, rather than one per block.

The mapping function selector 8 then follows the procedure described in the first embodiment for adjusting the selection signal in the selection memory 10, incrementing or decrementing the selection signal by one when the mapping-function numbers obtained by the maximum count selector 36 are consistently higher than the selection signal value, or consistently lower, over a certain number of consecutive images.

The number of overlapping ranges in the luminance histogram may be less than the total number of mapping functions employed in the primary mapper 12. In that case only some of the mapping functions can be selected directly by mapping-function numbers obtained from the luminance histogram, but the other mapping functions can be selected through incrementation or decrementation of the selection signal.

Only one selection signal is stored in the selection memory 10. The primary mapper 12 maps all pixels according to the single mapping function selected by the stored selection signal. The output of the primary mapper 12 is the enhanced luminance signal Y$_{enh}$.

The luminance contrast enhancer 2 in the second embodiment, like that in the first embodiment, avoids the various problems of the histogram equalization method, avoids flicker, and avoids the need for buffering of the luminance signal. Undulating distortion is also avoided, because the same mapping function is applied to the entire image.

Next, the operation of the chrominance contrast enhancer 4 will be described.

Figure 10:
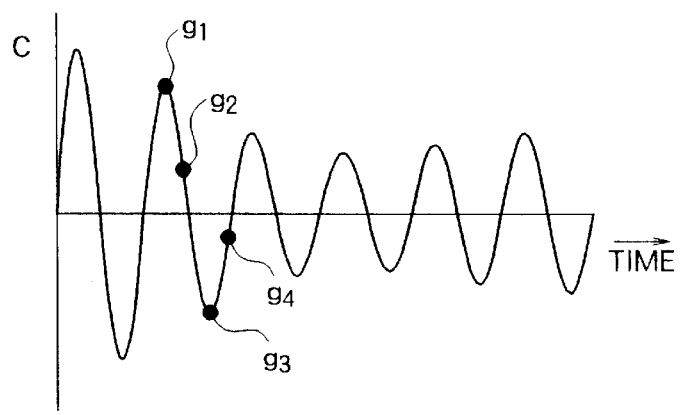
FIG. 10 shows a sampled chrominance signal waveform.

The 4f$_{SC}$ sampling circuit 38 digitizes the chrominance signal C by sampling at four times the subcarrier frequency f$_{SC}$. FIG. 10 illustrates four consecutive samples $g_1$, $g_2$, $g_3$, and $g_4$. Each group of four sample values corresponds to one period of the chrominance signal.

Figure 11A:
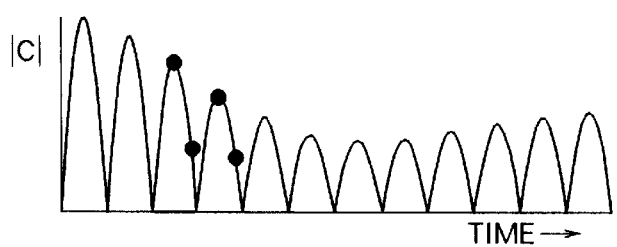
FIG. 11A shows the waveform in FIG. 10 converted to absolute values.
Figure 11B:
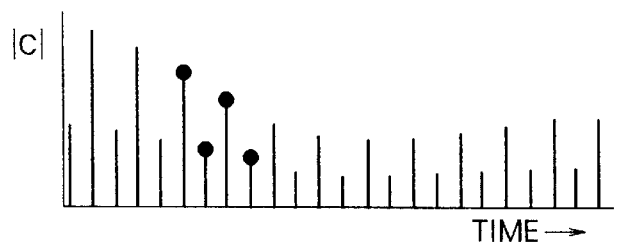
FIG. 11B shows the waveform in FIG. 10 converted to sampled absolute values.

The absolute value processor 40 takes the absolute values of the sample values. As illustrated in FIG. 11A, this is equivalent to rectifying the chrominance signal. The output of the absolute value processor 40 is a series of non-negative sample values as illustrated in FIG. 11B.

Figure 12:
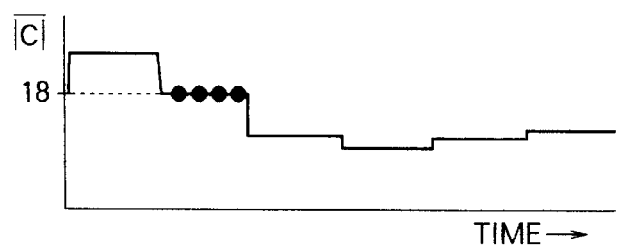
FIG. 12 shows a waveform obtained by taking mean values in FIG. 11B.

The one-period average processor 42 calculates the mean value of groups of four consecutive absolute sample values output from the absolute value processor 40. The calculated mean absolute value gives an approximate indication of the amplitude of one period of the chrominance signal C. The one-period average processor 42 can be described as replacing the four sample values with their mean absolute value and outputting the result as a digitized amplitude signal, as illustrated in FIG. 12.

Figure 13:
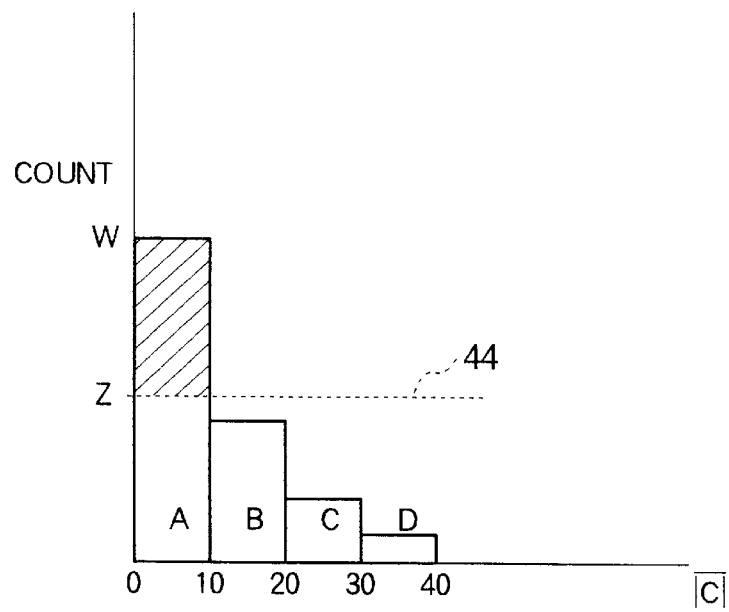
FIG. 13 illustrates chrominance histogram clipping in the second embodiment.

The chrominance histogram processor 26 in the second embodiment divides the chrominance amplitude scale into a plurality of ranges and counts the number of mean absolute values in each range. FIG. 13 shows a chrominance histogram in which chrominance amplitude is divided into four ranges A, B, C, and D, represented on the horizontal axis. The vertical axis indicates the count in each range, in one image.

Prior to normalization, the chrominance histogram processor 26 clips this histogram at a certain count level, indicated by the dotted line 44, and redistributes the clipped counts, indicated by hatching, to all four regions equally. Mathematically, in FIG. 13, W–Z is subtracted from the count for region A, then (W–Z)/4 is added to the count of each region A, B, C, and D. Clipping and redistribution prevent over-enhancement of color contrast.

The clipping level Z can be set by taking the value that would result if the histogram were flat, e.g. in FIG. 13 one-fourth the total number of chrominance signal periods per image, as a reference value, and multiplying this reference value by a parameter X greater than unity. Alternatively, the clipping level Z can be set by multiplying the maximum count value in the histogram by a parameter X less than unity.

Thus clipped and redistributed, the chrominance histogram is provided to the normalizer 28 and cumulative histogram processor 30, which convert the histogram to a normalized cumulative chrominance histogram. In this second embodiment, the normalized cumulative chrominance histogram is conceptually a piecewise linear function or polyline, as shown by the solid line in FIG. 14, consisting of straight segments in each of the four regions A, B, C, and D. The slopes of the segments are proportional to the clipped and redistributed chrominance histogram values.

Figure 14:
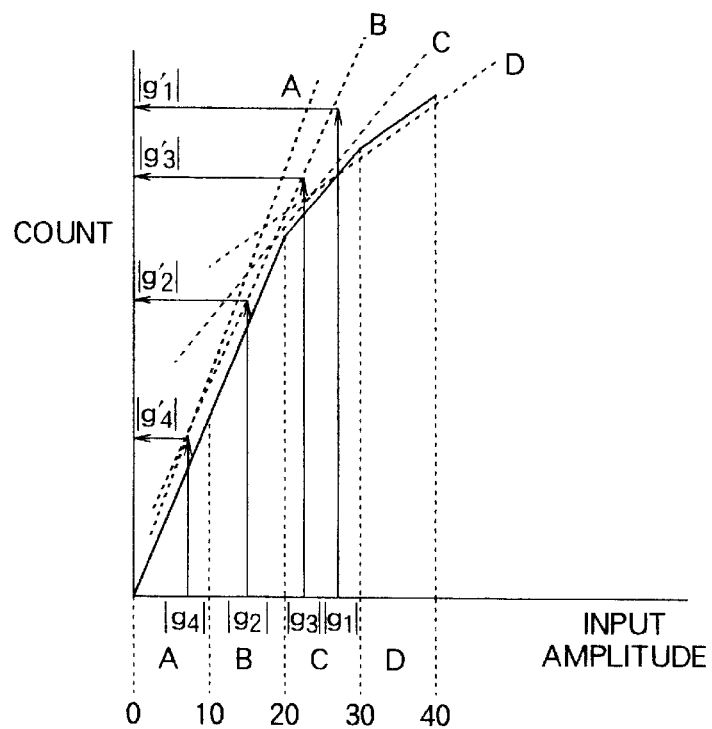
FIG. 14 illustrates chrominance mapping in the second embodiment.

The segments can be conceptually extended into four lines, also labeled A, B, C, and D in FIG. 14. What the cumulative histogram processor 30 actually outputs is four pairs of parameters P1 and P2, one pair of parameters defining each of the four lines by the linear equation $$g'=P_1 g+P_2.$$

The histogram mapper 32 receives the digitized chrominance signal output by the $^4 f_{SC}$ sampling circuit 38, the mean absolute values output by the one-period average processor 42, and the parameters output by the cumulative histogram processor 30. For each group of four chrominance samples, the histogram mapper 32 determines the range into which their mean absolute value falls, and gets the pair of parameters $P_1$ and $P_2$ output by the cumulative histogram processor 30 for that range. These parameters are used to alter the magnitude (absolute value) of each of the four sample values by the linear formula above. The signs of the sample values are left unchanged.

The four samples $g_1$, $g_2$, $g_3$, and $g_4$ in FIG. 10, for example, have the mean value eighteen (shown in FIG. 12), which lies in range B (shown in FIG. 13). The magnitudes of all four samples are therefore mapped by line B in FIG. 14, to the values $|g_1'|$, $|g_2'|$, $|g_3'|$, and $|g^{4''}|$, as shown. The signed values $g_1'$, $g_2'$, $g_3'$, and $g_4'$ are output as part of the enhanced chrominance signal $C_{enh}$ ($g_1'$ and $g_2'$ are positive; $g_3'$ and $g_4'$ are negative).

The process described above ensures that all four samples in the same period of the chrominance signal are mapped linearly. This prevents alteration of the phase of the chrominance signal. The second embodiment is accordingly able to enhance color-saturation contrast without altering hue.

Next, several variations of the second embodiment will be described.

When a moving picture is transferred from film to a video cassette, the resulting video signal has a lower dynamic range than the original optical signal, so there is a particular need to enhance contrast at the black end of the luminance scale. It is preferable for this reason that the maximum count selector 36 selects a mapping-function number corresponding to the minimum luminance value in the luminance range with the highest count in the luminance histogram.

Some manufacturers of pre-recorded video cassettes, however, add a luminance offset, referred to as a black offset, to the luminance signal, shifting the distribution of luminance levels by a certain amount toward the high end of the luminance scale. This causes an unwanted drift of the selection signal away from the black end of the luminance scale.

To counteract this drift, in calculating the luminance histogram, the luminance histogram processor 34 can be adapted to disregard pixels with luminance values above a certain cut-off level. In FIG. 9, for example, luminance values higher than one hundred forty could be disregarded. This prevents the selection signal from drifting too far away from the black end of the luminance scale.

The second embodiment of the invention is not limited to selection of a mapping-function number corresponding to the minimum luminance value in the luminance range with the highest count in the luminance histogram. The invention can be practiced by selecting another value, such as the maximum value or midpoint value.

In the chrominance contrast enhancer 4, sampling of the chrominance signal is not limited to four samples per period. A higher sampling rate can be employed.

If the input chrominance signal C is a digital signal that has already been sampled at four times the subcarrier frequency (or a higher rate), the $4f_{SC}$ sampling circuit 38 can be omitted.

Although the number of chrominance amplitude ranges was four (A, B, C, and D) in the above description, the invention is not limited to this value. More than four ranges can be provided, for example, for finer adjustment of color saturation.

The cumulative histogram processor 30 was described as outputting pairs of parameter values, but it is also possible to have the cumulative histogram processor 30 output a look-up table representing a linear mapping function for each chrominance amplitude range, so that the histogram mapper 32 does not have to perform multiplications.

As the luminance and chrominance contrast enhancers in the first and second embodiments are independent, they can be combined in different ways. The luminance contrast enhancer 2 of the first embodiment can be combined with the chrominance contrast enhancer 4 of the second embodiment, or the luminance contrast enhancer 2 of the second embodiment can be combined with the chrominance contrast enhancer 4 of the first embodiment.

The first and second embodiments can be combined by providing a mode signal to switch the mapping function selector 8 between a first mode of operation as described in the first embodiment and a second mode of operation as described in the second embodiment. The secondary mappers 14, 16, and 18 and the weighted average processor 18 are enabled in the first mode and disabled in the second mode.

Third embodiment

Figure 15:
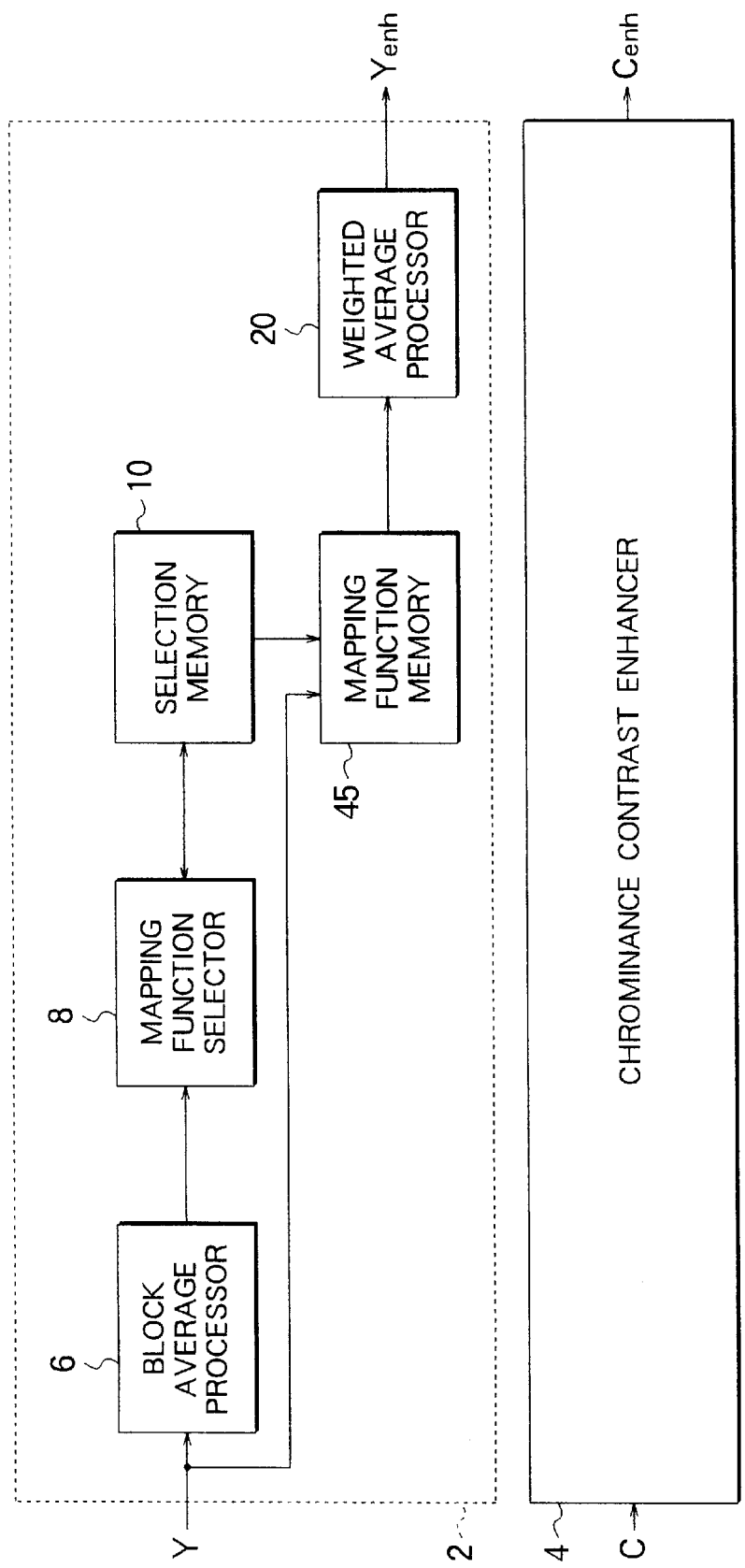
FIG. 15 is a block diagram of a third embodiment of the invention.

FIG. 15 shows the structure of the luminance contrast enhancer 2 of the third embodiment. The third embodiment also employs the chrominance contrast enhancer 4 of, for example, the second embodiment.

The block average processor 6, mapping function selector 8, selection memory 10, and weighted average processor 20 of the third embodiment are similar to the corresponding elements in the first embodiment, shown with the same reference numerals in FIG. 1. The parameter table and mappers of the first embodiment are replaced by a single mapping function memory 45.

Figure 16A:
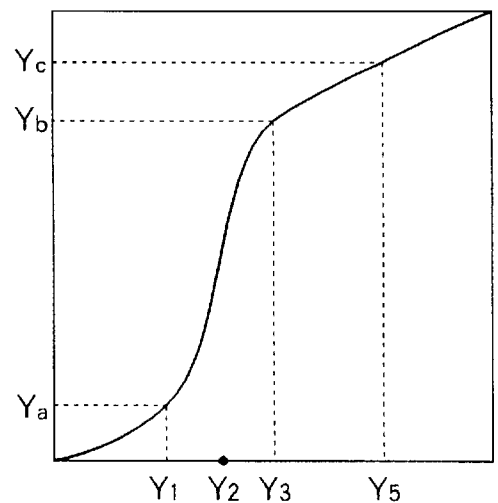
FIGS. 16A and 16B illustrate a type of mapping function that can be employed in the third embodiment.
Figure 16B:
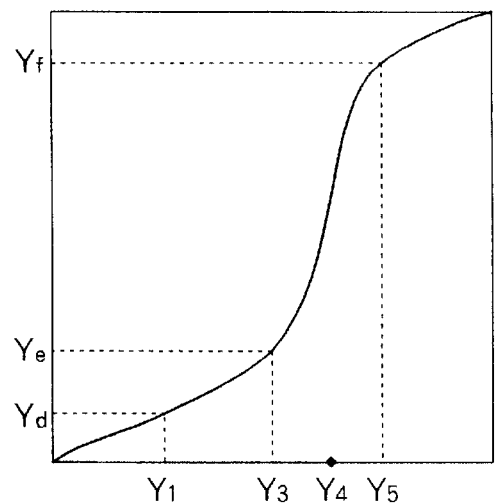

FIGS. 16A–B show examples of the types of mapping functions that can be stored in the mapping function memory 45. Whereas the mapping functions in the first and second embodiments consisted of line segments and could be calculated from parameters, the mapping function in FIGS. 16A–B are smooth curves, which are stored in the mapping function memory 45 in the form of a look-up tables. The luminance values Y on the horizontal axis in FIGS. 16A–B correspond to low-order address bits of the mapping function memory 45. The luminance values on the vertical axes are stored as data at the corresponding addresses. For example, $Y_a$ is stored at address $Y_1$.

The mapping function memory 45 contains data for a plurality of mapping functions of the type shown in FIGS. 16A–B (two of the mapping functions being shown in FIG. 16A–B), enhancing different luminance ranges. In the mapping function memory 45, different mapping functions are differentiated by their high-order address bits. Using hexadecimal address notation, if each mapping function is stored as a look-up table with two hundred fifty-six entries, then the first mapping function can be stored at addresses 0000 to 00FF, the second mapping function at addresses 0100 to 01FF, and so on.

Next the operation of the third embodiment will be described, focusing on the operation of the selection memory 10 and mapping function memory 45. The other elements operate as in the first embodiment.

The mapping function memory 45 receives the selection signals output by the selection memory 10 as high-order address signals, and the luminance signal Y as a low-order address signal. Output from the selection memory 10 is synchronized with the luminance signal Y in the same way as in the first embodiment, except that instead of outputting four selection signals simultaneously, the selection memory outputs the four selection signals one after another. Referring again to FIG. 2, during the interval while the mapping function memory 45 is receiving the luminance value of a pixel disposed in sub-block A1, the selection memory 10 outputs, for example, first the selection signal of block A, then the selection signal of block B, then the selection signal of block C, then the selection signal of block E.

These address inputs cause the mapping function memory 45 to output, for each input luminance value Y, the values to which Y is mapped by four mapping functions. The weighted average processor 20 takes a weighted average of these four values as in the first embodiment, thereby generating the enhanced luminance signal $Y_{enh}$.

One advantage of the third embodiment is that the mapping functions can have an arbitrary shape, so they can be designed for optimum contrast enhancement.

As a variation of the third embodiment, the mapping function selector 8 and selection memory 10 can operate as in the second embodiment, selecting a single mapping function for each image.

As another variation, the selection memory 10 can store and output the selection signals for the N most recent images, where N is an integer greater than one, and the weighted average processor 20 can take an average of all of the luminance levels to which each input pixel is mapped by the mapping functions selected in these most recent N images, to reduce flicker and distortion to a still lower level than in the preceding embodiments.

The mapping function memory 45 is functionally equivalent to the primary mapper 12 in the first or second embodiment. The only difference between the two is in the shape of the mapping functions, and the method by which the mapping operation is performed.

Fourth embodiment

The fourth embodiment employs the luminance contrast enhancer 2 and chrominance contrast enhancer 4 of either first, second, or third embodiment, and adds facilities for dealing with video signals having non-picture bands.

Referring to FIG. 17, the fourth embodiment adds a letterbox signal detector 46, a first vertical limiter 47, and a second vertical limiter 48 to the luminance contrast enhancer 2 and chrominance contrast enhancer 4 of the first, second, or third embodiment. The operation of the letterbox signal detector 46 and the vertical limiters 47 and 48 will be described below. The luminance and chrominance contrast enhancers 2 and 4 operate as already described.

Figure 18:
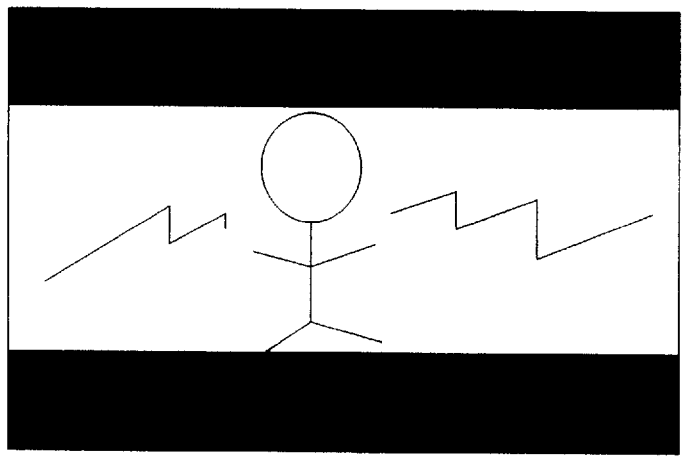
FIG. 18 illustrates a letterbox signal.

A letterbox signal is a video signal of the type illustrated in FIG. 18, consisting of a picture area with black non-picture bands above and below. Letterbox signals are produced for the purpose of reproducing a picture having one aspect ratio on a screen having a different aspect ratio, as when an extended-definition television (EDTV) signal having a 16:9 aspect ratio is to be reproduced on a screen having a 4:3 aspect ratio.

Referring again to FIG. 17, the luminance signal Y is input to the letterbox signal detector 46 and vertical limiter 47. The letterbox signal detector 46 determines whether the luminance signal Y is a letterbox signal. If the luminance signal is a letterbox signal, the letterbox signal detector 46 determines the line numbers of the horizontal scanning lines at the top and bottom of the picture area, and determines whether a caption is present in the non-picture band beneath the picture area.

The results of these determinations are provided to the vertical limiters 47 and 48. The vertical limiters 47 and 48 provide the luminance signal Y and chrominance signal C to the luminance and chrominance contrast enhancers 2 and 4, together with letterbox control signals L.

When the luminance signal Y is a letterbox signal, these letterbox control signals L restrict the luminance and chrominance contrast enhancement processing described in the first three embodiments to the picture area between the non-picture bands. If a caption is present in the lower non-picture band, the letterbox control signals L can instruct the luminance and chrominance contrast enhancers 2 and 4 to use a particular mapping function to enhance the contrast of the caption, or to use the identity function, which leaves the luminance and chrominance signals unchanged.

Figure 19:
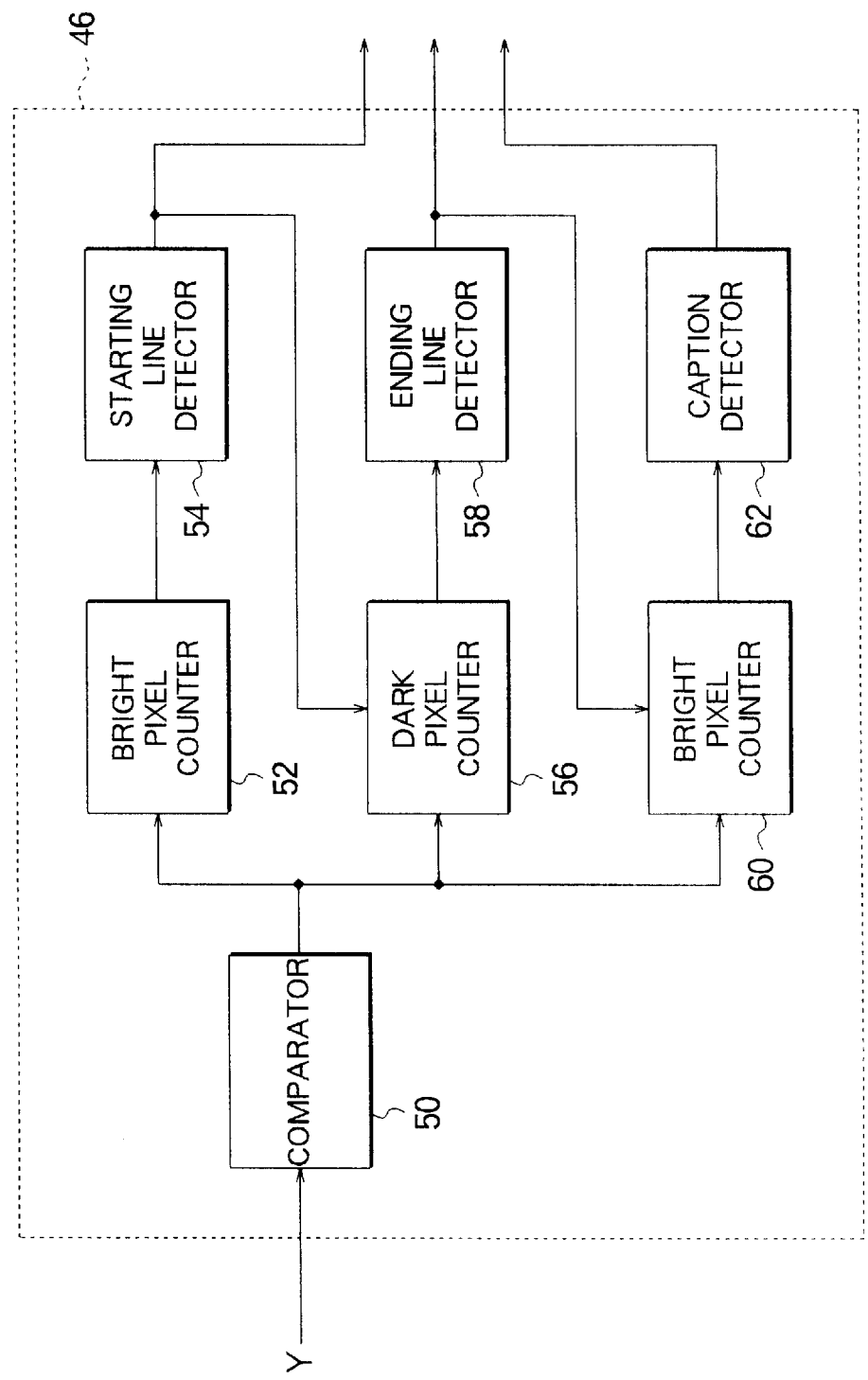
FIG. 19 illustrates the internal structure of the letterbox signal detector in FIG. 17.

FIG. 19 shows an example of the internal structure of the letterbox signal detector 46. The luminance signal is input to a comparator 50, which compares the level of the luminance signal at each pixel with a first threshold value, and classifies pixels as bright or dark according to whether the luminance level is above or below the first threshold.

To determine where the picture area starts, a bright-pixel counter 52 counts the number of bright pixels, as reported by the comparator 50, in each horizontal scanning line. At the end of each horizontal scanning line, the bright-pixel counter 52 outputs a bright-pixel count, then resets and starts counting from zero in the next horizontal scanning line. A starting line detector 54 compares the counts output by the bright-pixel counter 52 with a second threshold value. The first horizontal scanning line in which the count exceeds the second threshold is regarded as the starting line of the picture area. The starting line detector 54 outputs a detection signal when the starting line is detected, together with the line number of the starting line.

The detection signal from the starting line detector 54 activates a dark-pixel counter 56, which also receives the output of the amplitude comparator 50. Upon activation, the dark-pixel counter 56 starts counting the number of dark pixels in each horizontal scanning line. An ending line detector 58 compares the resulting dark-pixel counts with a third threshold value. The first line in which the dark-pixel count exceeds the third threshold is regarded as the end of the picture area, i.e. the first line of the lower non-picture band. The ending line detector 58 outputs a detection signal when the ending line is detected, together with the line number of the ending line.

The detection signal from the ending line detector 58 activates another bright-pixel counter 60, which also receives the output of the amplitude comparator 50. Upon activation, the bright-pixel counter 60 starts counting the number of bright pixels in each horizontal scanning line. A caption detector 62 compares the resulting counts with a fourth threshold value, and outputs a detection signal if any horizontal scanning lines with bright-pixel counts exceeding the fourth threshold are found in the lower non-picture band.

For each image of the video signal, the letterbox signal detector 46 accordingly outputs a pair of line numbers specifying the starting and ending lines of the picture area in the image, and a signal indicating the presence or absence of a caption. The vertical limiters 47 and 48 in FIG. 17 convert this information to the necessary letterbox control signals L, so that the calculation of average values, construction of histograms, and other contrast enhancement operations described in the first three embodiments are restricted to the area between the starting and ending lines of the picture area, including the starting line but not the ending line. The selection or calculation of mapping functions is then unaffected by the non-picture bands at the top and bottom of a letterbox picture.

Since the aspect ratio does not normally change from image to image, the letterbox signal detector 46 can be adapted to keep track of the starting and ending line numbers of a certain number of consecutive images, and output starting and ending line numbers that have been averaged over that number of images.

Alternatively, the letterbox signal detector 46 can be adapted to change the starting and ending line numbers only if the change persists for a certain number of consecutive images. This will prevent contrast enhancement from being adversely affected by, for example, isolated letterbox detection errors.

Some letterbox signals, such as type-II extended-definition television (EDTV-II) video signals, include an identity (ID) code by which the signal type can be identified. The letterbox signal detector 46 can accordingly also be provided with a decoder to decode the ID code and set the starting and ending lines as specified in the standards for the identified signal type, instead of as determined by counting bright and dark pixels.

Fifth embodiment

Figure 20:
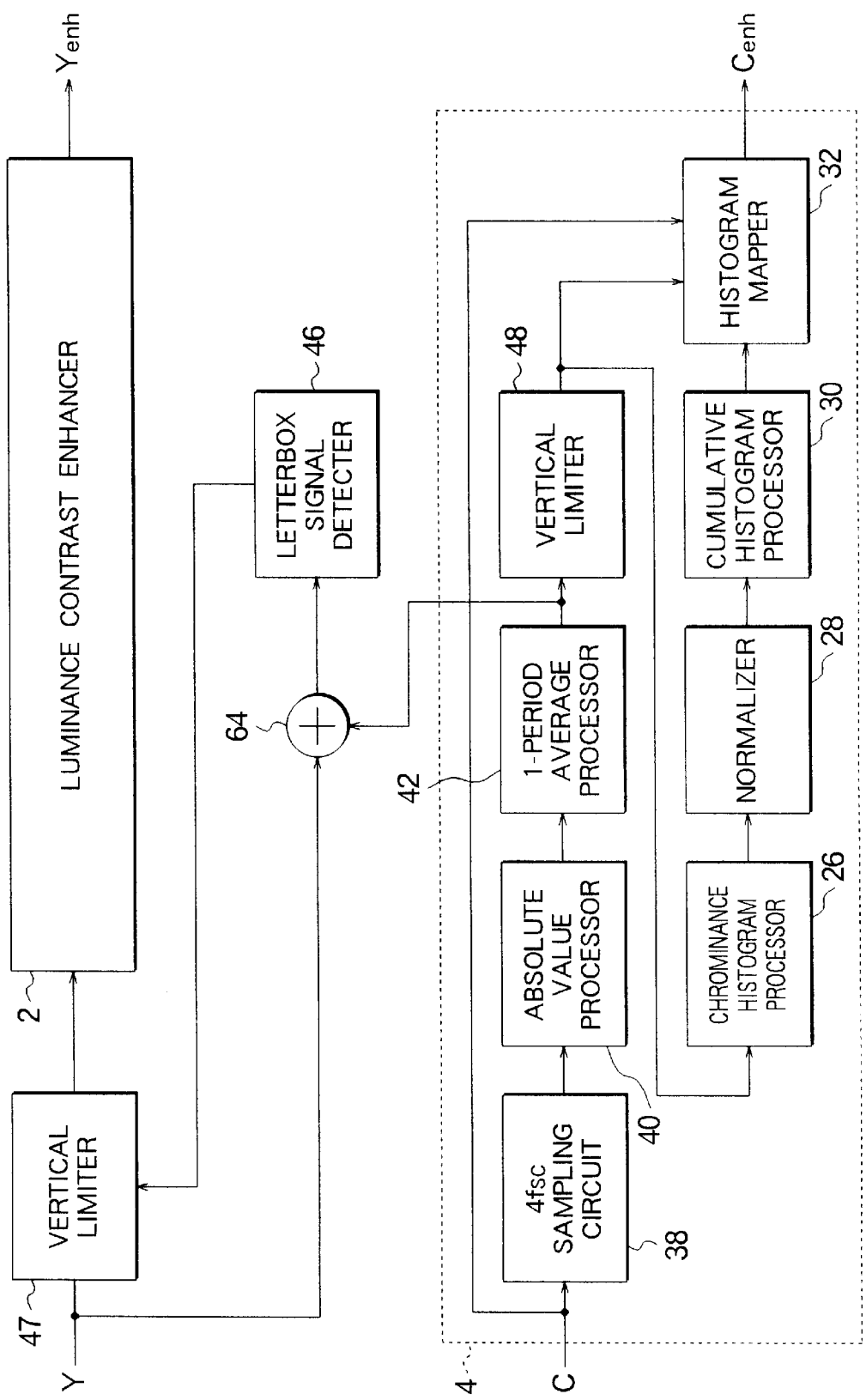
FIG. 20 is a block diagram of a fifth embodiment of the invention.

Referring to FIG. 20, the fifth embodiment uses both luminance and chrominance information to detect letterbox signals. The letterbox signal detector 46 and vertical limiters 47 and 48 in the fifth embodiment are as described in the fourth embodiment, but the fifth embodiment employs the chrominance contrast enhancer 4 of the second embodiment, and places the second vertical limiter 48 between the one-period average processor 42 and the chrominance histogram processor 26. The fifth embodiment also provides an adder 64, which adds the amplitude signal output from the one-period average processor 42 (shown in FIG. 12) to the luminance signal Y, and provides the sum to the letterbox signal detector 46.

The letterbox signal detector 46 in the fifth embodiment operates on the sum signal output from the adder 64 in the same way that the letterbox signal detector 46 in the fourth embodiment operated on the luminance signal Y. The other elements in the fifth embodiment also operate as explained in preceding embodiments, so detailed descriptions will be omitted. The luminance contrast enhancer 2 of either the first, second, or third embodiment may be employed.

By basing detection of the starting and ending lines of a letterbox signal on both the luminance and chrominance signals, the fifth embodiment can correctly place scanning lines having a low luminance level but a high color-saturation level in the picture area. Scanning lines of this type occur in blue areas, such as cloudless sky areas, or blue background or border areas.

Sixth embodiment

Figure 21:
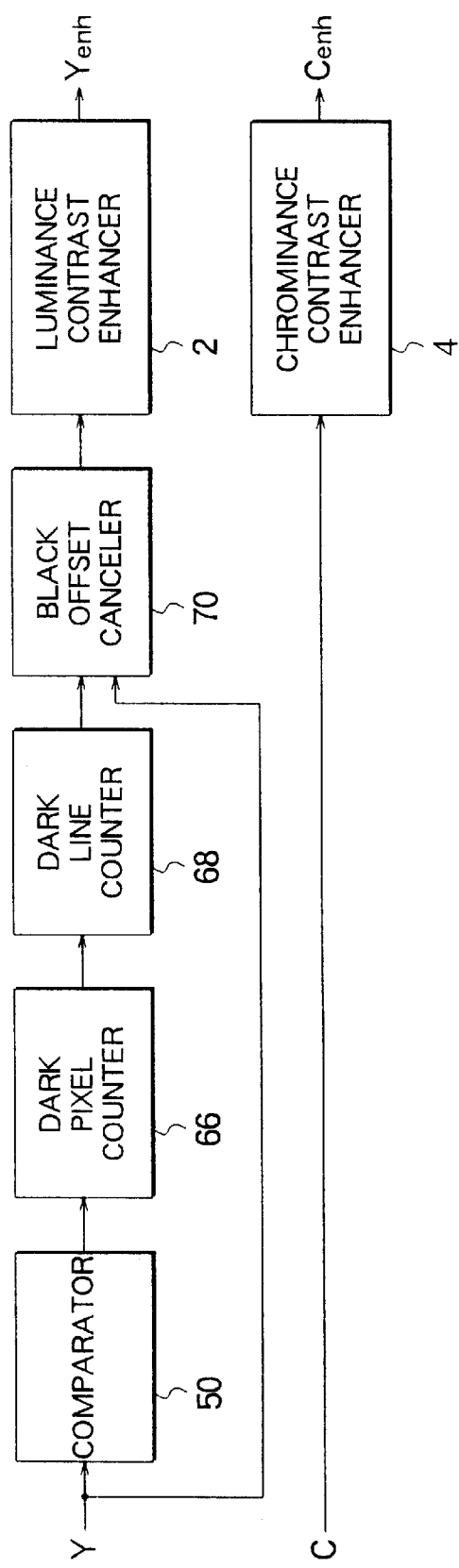
FIG. 21 is a block diagram of a sixth embodiment of the invention.

Referring to FIG. 21, the sixth embodiment comprises the luminance and chrominance contrast enhancers 2 and 4 of the first, second, or third embodiment, and a luminance pre-processing circuit consisting of the comparator 50 of the fourth embodiment, a dark-pixel counter 66, a dark-line counter 68, and a black-offset canceler 70.

Next, the pre-processing operation will be described.

The comparator 50 operates as described in the fourth embodiment, classifying pixels as bright or dark by comparing their luminance level with a threshold value. This threshold value, referred to below as a fifth threshold value, may be equal to the first threshold value employed in the fourth embodiment, but is not necessarily so.

The dark-pixel counter 66 counts the number of dark pixels in each horizontal scanning line, compares this number with a sixth threshold value, and classifies scanning lines as bright or dark. A dark scanning line is one in which the number of dark pixels exceeds the sixth threshold.

The dark-line counter 68 counts the number of dark scanning lines in a certain number of consecutive images, and compares this number with a seventh threshold value.

If the number of dark scanning lines thus counted is less than the seventh threshold level, the black-offset detector 70 subtracts a certain constant value from the luminance signal, thereby reducing the luminance level of all pixels uniformly.

The reduced luminance values are input to the luminance contrast enhancer 2. If the number of dark scanning lines is not less than the seventh threshold level, the luminance values are not reduced.

As noted earlier, pre-recorded video cassettes often have a black offset added to the luminance signal. This offset does not enhance contrast; it merely raises the overall luminance level. The purpose of the pre-processing in the sixth embodiment is to identify and remove this black offset, so that pixels that were originally black can be reproduced as truly black, and luminance contrast can be enhanced by an appropriate luminance mapping function.

The number of images included in the sum obtained by the dark-line counter 68 (the number of images over which the dark lines are counted) can be any positive number. Taking the sum over a large number of images slows the response of the black offset canceler 70, but reduces the risk that rapid on-and-off switching of the black offset canceler 70 might cause flicker.

As an alternative scheme for protection against flicker, the dark-line counter 68 can count the number of dark lines in each image, and the black offset canceler 70 can switch from off to on, or from on to off, only when the dark-line count exceeds the seventh threshold in a certain number of consecutive images, or fails to exceed the seventh threshold in a certain number of consecutive images.

The sixth embodiment is preferably combined with the fourth or fifth embodiment, to detect and deal with both black offset and letterbox video signals. If the first and fifth threshold values are the same, the comparator 50 can be shared. The dark-line counter 68 should be notified of the starting and ending lines of a letterbox signal, so that dark lines in non-picture bands can be excluded from the detection of black offset.

By employing the histogram equalization method to enhance color-saturation contrast and a mapping-function selection method to enhance luminance contrast, the invented contrast enhancer can perform independent and appropriate enhancement of both luminance and chrominance contrast. The letterbox signal detector and black offset canceler in the fourth to sixth embodiments enable contrast to be enhanced correctly even in video signals with non-standard aspect ratios, or video signals with a black offset.

Figure 22:
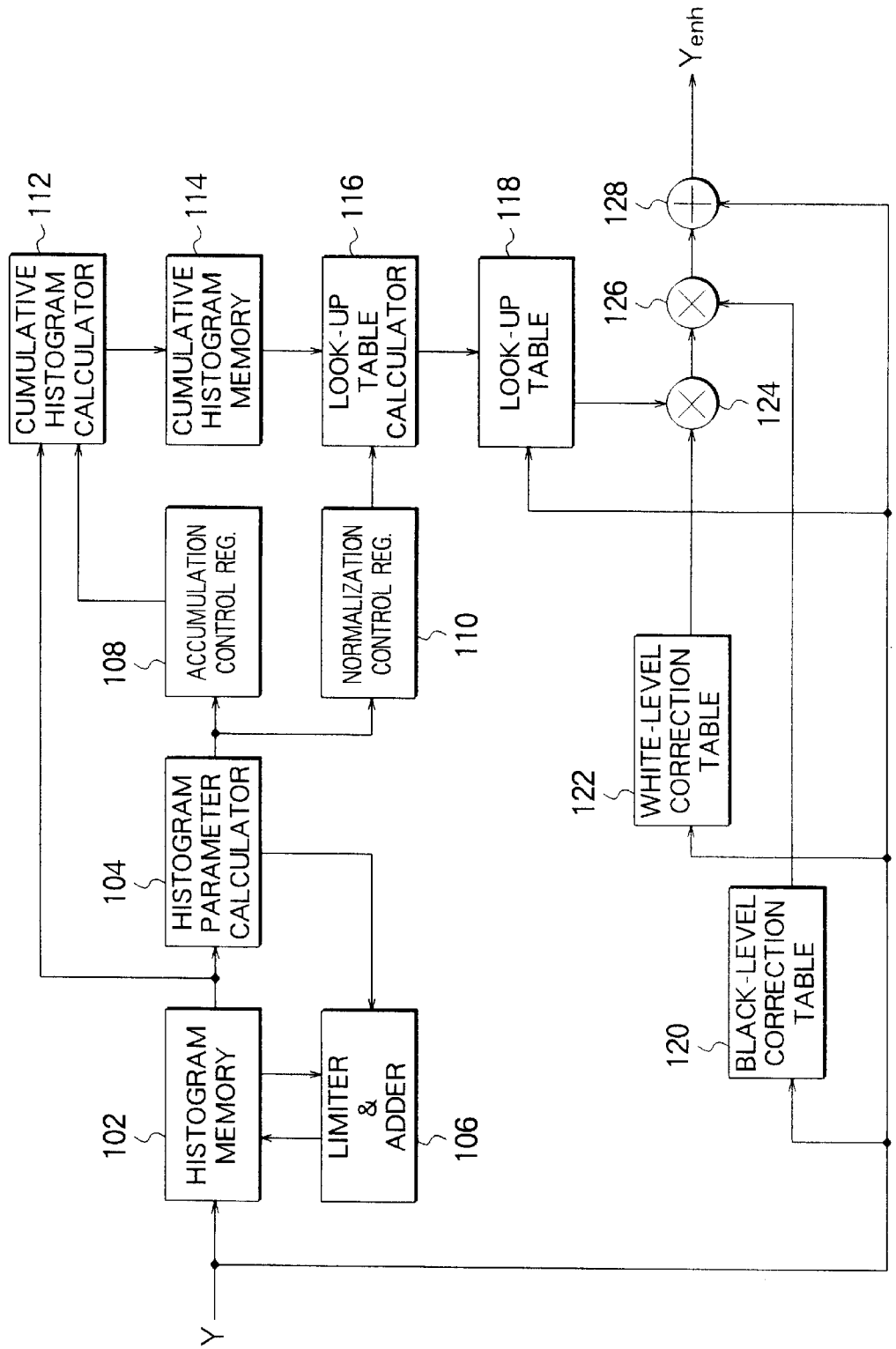
FIG. 22 is a block diagram of a conventional luminance contrast enhancer.

For comparison, FIG. 22 shows a conventional contrast enhancer that applies the histogram equalization method to the luminance signal. This enhancer comprises a histogram memory 102, a histogram parameter calculator 104, a limiter and adder 106, a pair of accumulation control registers 108, a normalization control register 110, a cumulative histogram calculator 112, a cumulative histogram memory 114, a look-up table calculator 116, a look-up table 118, a black-level correction table 120, a white-level correction table 122, two multipliers 124 and 126, and an adder 128.

The histogram memory 102 is initialized to an all-zero state at the beginning of each image, and receives the digitized luminance signal Y as an address signal. The limiter and adder 106 increments the values at the indicated addresses in the histogram memory 102 to create a luminance histogram. At the end of an image, the histogram parameter calculator 104 reads the histogram data, computes various statistics, and determines a clipping level, a fixed increment, starting and stopping luminance levels for the cumulative histogram, and a maximum normalized luminance level. These control parameters are supplied to the limiter and adder 106, accumulation control registers 108, and normalization control register 110.

The limiter and adder 106 clips the histogram in the histogram memory 102 at the designated clipping level, then adds the fixed increment to all count values in the histogram. These corrections help prevent over-enhancement.

The cumulative histogram calculator 112 calculates cumulative totals from the corrected histogram, between the starting and stopping levels designated in the accumulation control registers 108, and stores the resulting cumulative histogram in the cumulative histogram memory 114. The look-up table calculator 116 normalizes the cumulative histogram according to the maximum luminance level in the normalization control register 110 to create a mapping function, which is stored in the look-up table 118. The luminance signal Y is supplied as an address signal to the look-up table 118.

To avoid contrast compression at the black and white ends of the luminance scale, the luminance signal Y is also supplied as an address signal to the black-level correction table 120 and white-level correction table 122, which store correction factors, and the outputs of the three tables 118, 120, and 122 are multiplied together. As a further safeguard against over-enhancement, the resulting product is added to the original luminance signal Y, so that the enhanced luminance signal $Y_{enh}$ is halfway between the original and modified luminance signals.

Thus when the histogram equalization method is applied to the luminance signal, a complex series of corrections is needed in order to avoid over-enhancement and other unwanted effects. In the present invention, the luminance mapping functions are pre-designed to avoid these unwanted effects, rendering such corrections unnecessary.

When the histogram equalization method is applied to the chrominance signal, extensive corrections are also unnecessary because, as noted earlier, the eye is comparatively insensitive to color differences. The chrominance contrast enhancer in the second embodiment of the present invention performs a clipping process, but does not require additional correction factors as supplied by the black- and white-level correction tables in FIG. 22.

The invented contrast enhancer thus processes both the luminance and chrominance signals efficiently, by methods appropriate to each.

The invention being thus described, it will be obvious that the same may be varied in many ways. Such variations are not to be regarded as departure from the spirit and scope of the invention, and all such modifications as would as would be obvious to one skilled in the art are intended to be included within the scope of the following claims.

What is claimed is:

1. A contrast enhancer for enhancing contrast of a video signal representing luminance levels of pixels in a sequence of images constituting a moving picture, comprising:

a block average processor for receiving said video signal, dividing each image in said sequence of images into a plurality of areas, associating with each area among said plurality of areas a set of pixels in said image, and calculating a mean luminance level of said set of pixels, thereby obtaining a plurality of mean luminance levels for each said image;

a selection memory for storing a selection signal, wherein each value of the selection signal corresponds to a mapping function from among a predetermined set of mapping functions;

a mapping function selector coupled to said block average processor and said selection memory, for adjusting the value of said selection signal responsive to the value of a previous selection signal corresponding to the mean luminance levels in a plurality of images in said sequence of images; and a primary mapper coupled to said selection memory, for receiving said video signal and said selection signal, selecting the mapping function from among the predetermined set of mapping functions according to the value of said selection signal, and mapping the luminance levels represented by said video signal according to the mapping function thus selected.

2. The contrast enhancer of claim 1, wherein the set of pixels associated with each said area by said block average processor includes some of the pixels in said area and some of the pixels in areas adjacent to said area.

3. The contrast enhancer of claim 1, wherein each pixel is associated with exactly one of said areas.

4. The contrast enhancer of claim 1, wherein:

said mapping functions in said predetermined set of mapping functions enhance contrast in different luminance ranges;

said mapping functions have mapping-function numbers by which said mapping functions are identified;

the value of said selection signal designates said mapping functions by said mapping-function numbers;

said mapping function selector selects said mapping-function numbers according to said mean luminance levels; and if, in a state in which a certain luminance range is enhanced, the mapping functions selected by said mean luminance level continue to be one or ones for enhancing luminance range or ranges higher than said certain luminance range for a predetermined number of images, the value of said selection signal is changed to one for designating a mapping function for enhancement of a luminance range higher than said certain luminance range, and if, in a state in which a certain luminance range is enhanced, the mapping functions selected by said mean luminance level continue to be one or ones for enhancing luminance range or ranges lower than said certain luminance range for a predetermined number of images, the value of said selection signal is changed to one for designating a mapping function for enhancement of a luminance range lower than said certain luminance range.

5. The contrast enhancer of claim 4, wherein:

said mapping function selector obtains, for each said area, a mapping-function number of a mapping function that enhances contrast at the mean luminance level calculated by said block average processor for the set of pixels associated with said area;

said selection memory stores a separate selection signal for each said area;

said mapping function selector adjusts the value of said separate selection signal for each said area according to the mapping-function numbers obtained for said area in said plurality of images; and said primary mapper maps the luminance levels in each said area according to a mapping function designated by the value of said selection signal stored in said selection memory for said area;

said contrast enhancer further comprising:

a plurality of secondary mappers, coupled to said selection memory so that when said primary mapper receives a selection signal for a first area, said secondary mappers receive selection signals for areas adjacent to said first area, and map luminance levels in said first area according to mapping functions selected responsive to the values of said selection signals thus received in the same way as said primary mapper; and a weighted average processor for taking a weighted average of the luminance levels as mapped by said primary mapper and said secondary mappers.

6. The contrast enhancer of claim 1, wherein said selection memory stores just one selection signal for each said image in said sequence of images.

7. The contrast enhancer of claim 6, wherein said mapping function selector comprises:

a luminance histogram processor for calculating, for each said image, a luminance histogram of the mean luminance levels calculated by said block average processor, said luminance histogram consisting of counts of mean luminance levels disposed in different luminance ranges; and a maximum count selector for selecting a mapping function that enhances contrast in a luminance range having a maximum count in said luminance histogram;

wherein said mapping function selector adjusts the value of said selection signal responsive to mapping functions selected by said maximum count selector in said plurality of images.

8. The contrast enhancer of claim 7 wherein said luminance histogram excludes mean luminance levels exceeding a certain cut-off level.

9. The contrast enhancer of claim 7, wherein the luminance ranges in said luminance histogram are mutually overlapping.

10. The contrast enhancer of claim 1, further comprising a chrominance contrast enhancer for performing enhancement of a chrominance component of the video signal independently of the enhancement of the luminance component.

11. The contrast enhancer of claim 10, wherein said chrominance component represents color saturation by amplitude of a subcarrier signal having a certain subcarrier frequency, further comprising:

a sampling circuit for sampling said chrominance component at a sampling frequency at least four times higher than said subcarrier frequency, thereby obtaining sample values;

an absolute value processor coupled to said sampling circuit, for taking absolute values of said sample values;

a one-period average processor coupled to said absolute value processor, for calculating mean values of said absolute values, each mean value being calculated from the absolute values in one period of said subcarrier signal;

a chrominance histogram processor for calculating, for each image in said sequence of images, a chrominance histogram of the mean values calculated by said one-period average processor, said chrominance histogram consisting of counts of mean values disposed in different ranges;

a normalizer coupled to said chrominance histogram processor, for normalizing said chrominance histogram to produce a normalized chrominance histogram;

a cumulative histogram processor coupled to said normalizer, for calculating a cumulative chrominance histogram from said normalized chrominance histogram; and a histogram mapper coupled to said cumulative histogram processor, for adjusting the amplitude of said subcarrier signal by mapping all of the sample values in each said one period of said subcarrier signal according to a linear formula determined by said cumulative chrominance histogram.

12. The contrast enhancer of claim 11, wherein said chrominance histogram processor clips said chrominance histogram by subtracting, from counts exceeding a certain clipping level, amounts by which said counts exceed said clipping level, then redistributes the amounts thus subtracted equally among all counts in said chrominance histogram.

13. The contrast enhancer of claim 11, further comprising:

a letterbox signal detector for receiving said video signal, comparing said video signal with a first threshold value, and thus determining whether said video signal represents a picture area disposed between upper and lower non-picture bands;

a first vertical limiter coupled to said letterbox signal detector, for excluding said non-picture bands from processing by said block average processor and primary mapper; and a second vertical limiter coupled to said letterbox signal detector, for excluding said non-picture bands from processing by said chrominance histogram processor and said histogram mapper.

14. The contrast enhancer of claim 13, also comprising an adder coupled to said one-period average processor, for adding said mean values of said absolute values to said video signal, and supplying a resulting sum to said letterbox signal detector in place of said video signal.

15. The contrast enhancer of claim 13, wherein said letterbox signal detector also detects letterbox signals by recognizing an identity code contained in said video signal.

16. The contrast enhancer of claim 13, wherein said video signal has successive horizontal scanning lines, and said letterbox signal detector comprises:

a first counter for counting pixels with luminance levels exceeding said first threshold value, in each horizontal scanning line and outputting resulting counts;

a starting line detector coupled to said first counter, for comparing the counts output by said first counter with a second threshold value, thereby identifying a starting horizontal scanning line of said picture area;

a second counter for counting pixels with luminance levels not exceeding said first threshold value, in each horizontal scanning line, after identification of said starting horizontal scanning line by said starting line detector and outputting resulting counts; and an ending line detector coupled to said second counter, for comparing the counts output by said second counter with a third threshold value, thereby identifying an ending horizontal scanning line of said picture area; wherein said letterbox signal detector notifies said first vertical limiter and said second vertical limiter of said starting horizontal scanning line and said ending horizontal scanning line.

17. The contrast enhancer of claim 16, wherein said letterbox signal detector also comprises:

a third counter for counting pixels with luminance levels exceeding said first threshold value, in each horizontal scanning line, after identification of said ending horizontal scanning line by said ending line detector; and a caption detector coupled to said third counter, for comparing counts output by said third counter with a fourth threshold value, thereby determining whether a caption is present below said picture area, and notifying said first vertical limiter when said caption is present; wherein when said caption is present, said first vertical limiter directs said primary mapper to apply a particular mapping function below said picture area, to enhance contrast of said caption.

18. The contrast enhancer of claim 1, wherein said video signal has successive horizontal scanning lines, and said contrast enhancer also comprises:

a comparator for receiving said video signal and comparing the luminance level of said video signal with a fifth threshold value;

a fourth counter for counting pixels with luminance levels not exceeding said fifth threshold value, thereby producing a dark-pixel count for each horizontal scanning line;

a fifth counter for counting horizontal scanning lines in which said dark-pixel count exceeds a sixth threshold value, thereby producing a dark-line count for each image in said sequence of images; and a black offset canceler for subtracting a certain value uniformly from said video signal, when said dark-line count does not exceed a seventh threshold value, and supplying a resulting signal to said block average processor in place of said video signal.

19. The contrast enhancer of claim 1, said mapping function selector incrementally adjusting said selection signal at a limited rate of change.

20. A method of enhancing contrast of a video signal representing luminance levels of pixels in a sequence of images constituting a moving picture, comprising the steps of:

dividing each image in said sequence of images into a plurality of areas;

associating with each area among said plurality of areas a set of pixels in said image;

calculating a mean luminance level of said set of pixels, thereby obtaining a plurality of mean luminance levels for each said image;

storing a selection signal, wherein each value of the selection signal corresponds to a mapping function from among a predetermined set of mapping functions;

adjusting the value of the selection signal responsive to the value of a previous selection signal corresponding to the mean luminance levels in a plurality of images in said sequence of images;

selecting a mapping function from among the predetermined set of mapping functions according to the value of said selection signal; and mapping the luminance levels represented by said video signal according to the mapping function thus selected.

* * * * *